(12) United States Patent
Houston

(10) Patent No.: US 11,671,268 B2
(45) Date of Patent: Jun. 6, 2023

(54) PRIVATE, ARRIVAL-TIME MESSAGING

(71) Applicant: University of Louisiana at Lafayette, Lafayette, LA (US)

(72) Inventor: Louis Houston, Lafayette, LA (US)

(73) Assignee: University of Louisiana at Lafayette, Lafayette, LA (US)

(*) Notice: Subject to any disclaimer, the term of this patent is extended or adjusted under 35 U.S.C. 154(b) by 307 days.

(21) Appl. No.: 16/867,778

(22) Filed: May 6, 2020

(65) Prior Publication Data

US 2020/0374141 A1 Nov. 26, 2020

Related U.S. Application Data

(60) Provisional application No. 62/852,567, filed on May 24, 2019.

(51) Int. Cl.
*H04L 9/32* (2006.01)
*H04L 7/00* (2006.01)
*H04L 51/046* (2022.01)
*H04L 51/18* (2022.01)

(52) U.S. Cl.
CPC .......... *H04L 9/3297* (2013.01); *H04L 7/0012* (2013.01); *H04L 51/046* (2013.01); *H04L 51/18* (2013.01)

(58) Field of Classification Search
CPC ... H04L 9/3297; H04L 7/0012; H04L 51/046; H04L 51/18; H04L 7/00
See application file for complete search history.

(56) References Cited

U.S. PATENT DOCUMENTS

| | | | |
|---|---|---|---|
| 2004/0032354 A1* | 2/2004 | Knobel | H04B 1/7174 341/155 |
| 2007/0030841 A1* | 2/2007 | Lee | G01S 19/17 370/352 |
| 2008/0077336 A1* | 3/2008 | Fernandes | H02J 13/00006 702/65 |
| 2010/0027794 A1* | 2/2010 | Yuan | H04L 63/1466 380/278 |
| 2010/0054274 A1* | 3/2010 | Breyer | H04J 3/0658 370/458 |
| 2011/0206039 A1* | 8/2011 | Lee | H04W 64/00 709/224 |
| 2012/0254677 A1* | 10/2012 | Hann | H04L 7/033 714/707 |
| 2016/0112192 A1* | 4/2016 | Earl | H04L 9/0852 380/44 |
| 2020/0309829 A1* | 10/2020 | He | G01R 22/10 |
| 2021/0173065 A1* | 6/2021 | Trainin | G01S 7/006 |
| 2022/0278834 A1* | 9/2022 | Kirsanov | H04L 9/0858 |

* cited by examiner

*Primary Examiner* — Sargon N Nano
(74) *Attorney, Agent, or Firm* — Kean Miller, LLP; Russel O. Primeaux; Lauren J. Rucinski

(57) ABSTRACT

This invention provides a secure method for sending data—private, arrival-time messaging. Private, arrival-time messaging is based on classical physics and not quantum mechanics. It insures a private language for communicators with privately-synchronized clocks. In this method, there is no encrypted message available to an eavesdropper. A private message is mapped onto a time measurement known only to an intended sender and an intended receiver such that a third party knowing only the arrival time of the message and not the time measurement can never know the private message.

3 Claims, No Drawings

US 11,671,268 B2

PRIVATE, ARRIVAL-TIME MESSAGING

CROSS REFERENCE TO RELATED APPLICATIONS

This application claims priority to the provisional U.S. patent application No. 62/852,567 entitled "Private, Arrival-Time Messaging," filed May 24, 2019.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

SUMMARY OF THE INVENTION

This invention relates to a system for private messaging wherein a private message is mapped onto a time measurement known only to an intended sender and an intended receiver such that a third party knowing only the arrival time of said message and not said time measurement can never know the private message.

In a preferred embodiment, the method comprises synchronizing at least two clocks to a given frequency and zero phase; mapping at least one message into at least one time measurement, said time measurement being generated by said at least two clocks and being a private time; and transmitting an energy pulses with a set arrival time, said set arrival time being a public time.

BACKGROUND

Quantum cryptography was developed in the late 1980s. Quantum cryptography uses the rules of quantum mechanics to allow information to be sent from one part of the universe to another with complete privacy. Within a few years, researchers demonstrated the technique in the lab, and today quantum cryptography is becoming commercially viable However, there are pitfalls with the currently available methods. Because quantum particles cannot be measured without destroying the information they contain, the only way to ensure that a message is received without any of the information "leaking" is to determine the location of the receipt of the information. For example, if the photons arrive in the same state they were sent, an eavesdropper could not have possibly extracted the information they contain. But the photons arriving in a different state is clear evidence that the information was "leaked" into the environment and the message is not secure. (In practice, physicists can be sure that a message is secure as long as this leakage is below some critical threshold.). Thus, the issue is that the leakage becomes apparent only after it has occurred. So an eavesdropper would already have the information by the time the sender and/or intended recipient was aware of the interception.

Accordingly, a quantum processes to send a code called a one-time pad—a set of random numbers—that can be used to encrypt a message is used to encrypt the original message to combat this issue. The encrypted message is sent over an ordinary telecommunications channel and decoded in the usual way. The technique is called quantum key distribution. Quantum key distribution allows for the one-time pad to be sent with complete privacy. If the one-time pad is overheard, i.e. intercepted or leaked, the sender and/or intended receipt simply disregard it and send another, until they can be sure that the process was completely private.

The method exploits the quantum phenomenon of entanglement. This occurs when quantum particles are so closely linked that they share the same existence—for example, when they are both created at the same time and place.

When this happens, the particles remain linked, even when they are separated by vast distances. And a measurement on one particle immediately influences the state of the other.

So the trick is to create a set of entangled particles, such as photons, and encode information in their polarization state. So vertical polarization could represent a 1 and horizontal polarization a 0, for instance.

For example, the sender keeps one half of each pair and sends the others to the intended receiver who then has a set of photons that are entangled with sender's photons. The receiver separates his photons randomly into two groups. The receiver measures the polarizations of one set and sends the results back to sender. Sender then checks whether the states have changed during transmission—in other words, whether a third-party has been monitoring, viewing, and/or hearing the conversation.

If not, the sender and receiver know that a third party could not have seen the other photons either, because they have been separated at random. And that means sender and receiver can use the remaining photons to transmit data using the normal process of quantum communication, which is perfectly private.

However, this is practically difficult because the photons have to be stored while the checking process is ongoing. This can be done by sending the photons around a two-kilometer loop of optical fiber and carrying out the checks as quickly as possible. The longer it takes, the more likely the photons are to be absorbed or scattered by the optical fiber.

Various improvements are needed to make this kind of system commercially viable. But the work is an important stepping stone toward entirely quantum-based secure communication. Banks, governments, and military agencies will be watching eagerly.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

Private, arrival-time messaging is based on classical physics and not quantum mechanics. Therefore, it is not based on entanglement. It insures a private language for communicators with privately-synchronized clocks. In this method, there is no encrypted message available to an eavesdropper.

For example, suppose that Alice and Bob have privately synchronized clocks with discrete phases mapped into words and Alice sends one energy pulse to Bob that points to a specific word. An eavesdropper, Eve, could not determine what the word was. The word did not travel through space in an encrypted form, because the energy pulse cannot be decrypted to yield the word. And if Alice continues to send energy pulses with different arrival times to Bob, then the words that those pulses point to cannot be determined by Eve. Alice and Bob exist in a private space-time, so their messages also exist in their private space-time. Eve exists in the public space-time, so she cannot get access to Alice and Bob's messages. Consider two words in terms of arrival times:

$$t_1 + t_0 = T_1$$

$$t_2 + t_0 = T_2$$

In these equations, $t_0$ is the zero-phase time on Alice and Bob's clocks. Clearly, we can characterize a space-time with the zero-phase time. The times measured by Alice and Bob are $\{t_1, t_2\}$. These times map into specific words known to Alice and Bob. The times measured by Eve are $\{T_1, T_2\}$. As long as $T_1 \neq T_2$, from Eve's perspective, there are 2 equations and 3 unknowns, so the system is underdetermined. Consequently, Eve cannot determine $\{t_1, t_2\}$. If, however, $T_1 = T_2$, then from Eve's perspective, there is 1 equation and 2 unknowns, so Eve still cannot solve the equations and determine $\{t_1, t_2\}$, but from the redundancy of the arrival times, information about the probability distribution of the message can be obtained. We can conclude that as long as the arrival times are not repeated, the system of equations will remain underdetermined, so that Eve cannot determine Alice and Bob's signal arrival times or determine $t_0$ (i.e. move into Alice and Bob's space-time) and gain information about the message from redundancy. In this case, we can say that Alice and Bob have their own private language.

In the above example, the 2 encrypted words are the arrival times: $\{t_1, t_2\}$. Consequently, even if Eve can move into Alice and Bob's space-time and determine $\{t_1, t_2\}$, the information is still encrypted. When Eve cannot move into Alice and Bob's space-time, then there is no encrypted information available to Eve, making decryption or hacking impossible.

Thus, this invention is a novel, classical messaging system which is completely private and not difficult to construct and maintain over long distances. The system (i.e. Private, Arrival-Time Messaging) is described as follows.

Using the same short hand names as above: Alice (A) and Bob (B) communicate by measuring arrival times on their clocks with synchronized frequency ($\omega$) and zero phase ($\varphi$). $\omega$ and $\varphi$ are known only to Alice and Bob.

The transmission of energy pulses with arrival times: $\{T_j\}$, $j \in \{1, 2, \ldots\}$, as measured by a public clock, from A to B, separated by a distance: $\Delta x$ is denoted by:

$$A: T_j - \frac{\Delta x}{v} \rightarrow B: T_j \quad (1)$$

where $v$ is the speed of the energy pulses. The messages are encoded in the set:

$$\left\{ t_j \bmod\left(\frac{2\pi}{\omega}\right) \right\}$$

which are times as measured on the private clocks. The set of equations which connect private and public times is:

$$\left\{ \omega t_j \bmod\left(\frac{2\pi}{\omega}\right) + \varphi = \omega_0 T_j \bmod\left(\frac{2\pi}{\omega_0}\right) \right\} \quad (2)$$

where $\omega_0$ is the frequency of the public clock and the zero phase is zero, with the phase equivalence: $\theta + 2n\pi = \theta$, $n \in \{1, 2, \ldots\}$, $0 \leq \theta < 2\pi$. Alice and Bob can directly measure $$\left\{ t_j \bmod\left(\frac{2\pi}{\omega}\right) \right\}$$

and decode the messages. If the resolution of the clocks is extremely high, then many messages can be sent without repeating the arrival times. Consequently, as long as there is no redundancy in the set:

$$\left\{ T_j \bmod\left(\frac{2\pi}{\omega}\right) \right\},$$

then the set of equations (2) is underdetermined if $\omega$ and $\varphi$ are unknown and no information can be obtained about the probability distribution of the message. Consequently, an eavesdropper (e.g. Eve) cannot solve the equations (2) and determine $$\left\{ t_j \bmod\left(\frac{2\pi}{\omega}\right) \right\},$$

in which is encoded the messages transmitted from A to B or derive information about the message from redundancy.

Without loss of generality, messages can be similarly sent from B to A.

EXAMPLE 1

A typical processing speed for a home computer is 2.5 GHz. The frequency is $$2.5 \times 10^9 \frac{1}{s}.$$

Mapping a word into each time measurement $T_j$ and sending messages at a rate of 50 Hz, would generate a choice of 50 million time measurements for each word. Each word is a byte of 8 bits of information. Consequently, 50 million bytes or 50 MB of messages can be sent with one pair of synchronized clocks. Since the clock here is a computer, a key can be stored that privately maps words into time measurements $\{t_j\}$ on a memory stick. In fact, 1,000 keys can be stored on a 50 GB memory stick, resulting in 50 GB of private messages with one memory stick.

For the purpose of understanding the PRIVATE, ARRIVE-TIME MESSAGING, references are made in the text to exemplary embodiments of a PRIVATE, ARRIVE-TIME MESSAGING, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

The invention claimed is:

1. A method for private messaging comprising:
   a. synchronizing a first clock located a set distance away from said second clock to a given frequency and zero phase;
   b. encrypting a message at said first clock to be transmitted to said second clock such that said encryption is based on said given frequency and said zero phase to generate a time measurement known only to said first clock and said second clock, said time measurement being the arrival time of said encrypted message at said second clock; and
   c. transmitting an energy pulse, wherein said energy pulse has a publicly available arrival time at said second clock that is not equal to said arrival time measured by said first clock and said second clock.

2. The method of claim 1 wherein said first clock and said second clock are computer generated.

3. A method for delivering an encrypted message comprising
   a. encrypting a message on a first computer and transmitting said message from a first computer to a second computer, wherein said first computer and said second computer are set to a frequency and phase known only to said first computer and said second computer such that said frequency and phase create a private arrival time of said encrypted message at said second computer and said encrypting is based on said private arrival time;
   b. transmitting said encrypted message through an energy pulse from said first computer to a second computer, wherein said transmissions is complete from said first computer to said second computer at a publicly known arrival time that is based on the distance between said first computer and said second computer and the speed of said energy pulse;
   wherein said publicly known arrival time comprises a frequency and phase that is not equal to said frequency and phase of said private arrival time.

* * * * *